US011829243B2

(12) United States Patent
Jenkinson et al.

(10) Patent No.: US 11,829,243 B2
(45) Date of Patent: Nov. 28, 2023

(54) ERROR EVALUATION FOR A MEMORY SYSTEM

(71) Applicant: Micron Technology, Inc., Boise, ID (US)

(72) Inventors: Matthew D. Jenkinson, Boise, ID (US); Seth A. Eichmeyer, Boise, ID (US); Christopher G. Wieduwilt, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 62 days.

(21) Appl. No.: 17/572,129

(22) Filed: Jan. 10, 2022

(65) Prior Publication Data

US 2023/0222032 A1 Jul. 13, 2023

(51) Int. Cl.
*G06F 11/10* (2006.01)
*G06F 11/07* (2006.01)
*G06F 11/30* (2006.01)

(52) U.S. Cl.
CPC ........ *G06F 11/1068* (2013.01); *G06F 11/076* (2013.01); *G06F 11/0772* (2013.01); *G06F 11/0793* (2013.01); *G06F 11/3037* (2013.01)

(58) Field of Classification Search
CPC ............. G06F 11/3037; G06F 11/0793; G06F 11/0772; G06F 11/076; G06F 11/1068
See application file for complete search history.

(56) References Cited

U.S. PATENT DOCUMENTS

| | | | | |
|---|---|---|---|---|
| 2014/0136873 A1* | 5/2014 | Breternitz | ............. | G06F 1/3275 713/340 |
| 2017/0123882 A1* | 5/2017 | Healy | ................. | G06F 11/0766 |
| 2020/0192749 A1* | 6/2020 | Richter | ................ | G06F 11/1048 |
| 2020/0286164 A1* | 9/2020 | Kade | ...................... | G06Q 20/42 |

\* cited by examiner

*Primary Examiner* — Guy J Lamarre
(74) *Attorney, Agent, or Firm* — Holland & Hart LLP

(57) ABSTRACT

Methods, systems, and devices for error evaluation for a memory system are described. A memory device may be configured to monitor access errors of the memory device to evaluate a likelihood that such errors are related to a failure of the memory device itself or to a failure outside the memory device. For example, a memory device may monitor a respective quantity of errors for each of a set of banks and, if the memory device detects that multiple banks are associated with a threshold quantity of access errors, the memory device may infer the presence of a failure outside the memory device. The memory device may store an indication of such a detection, which may be used to support failure diagnosis or resolution efforts, such as refraining from replacing a memory device when access errors are more likely to be the result of a system failure.

25 Claims, 7 Drawing Sheets

ERROR EVALUATION FOR A MEMORY SYSTEM

FIELD OF TECHNOLOGY

The following relates to one or more systems for memory, including error evaluation for a memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A system may implement a memory device that is operable to provide storage locations (e.g., addresses) that may be used by the system for writing or reading information. In some examples, errors related to the operation of such a memory device may be associated with faults outside the memory device (e.g., system failures), such as power supply failures, socket damage, chipset training issues, or motherboard issues, among others. However, some such errors may be improperly attributed to a failure of the memory device, which may result in improper fault diagnosis or improper efforts toward fault resolution in the system, such as an unnecessary replacement of the memory device.

In accordance with examples as disclosed herein, a memory device may be configured to monitor access errors of the memory device to evaluate a likelihood that such errors are related to a failure of the memory device itself or to a failure outside the memory device (e.g., a failure of the system, a failure of a host device coupled with the memory device). For example, a memory device may include multiple banks (e.g., multiple sets of physical addresses), and may monitor a respective quantity of errors for each of the banks. If the memory device detects that multiple banks are associated with a threshold quantity of access errors (e.g., that each bank of a plurality of banks is associated with a quantity of access errors that exceeds a threshold), the memory device may infer the presence of a failure outside the memory device, because such a distribution of access errors may be statistically unlikely to be a result of a failure of the memory device itself. The memory device may store an indication of such a detection (e.g., that the memory device has inferred a presence of a failure outside the memory device), which may be used to support improved fault diagnosis or resolution efforts, such as refraining from replacing a memory device when access errors are more likely to be the result of a system failure.

Features of the disclosure are initially described in the context of systems and dies as described with reference to FIGS. 1 and 2. Features of the disclosure are described in the context an error evaluation implementation as described with reference to FIG. 3. These and other features of the disclosure are further illustrated by and described with reference to an apparatus diagram and flowcharts that relate to error evaluation for a memory system as described with reference to FIGS. 4-7.

Figure 1:
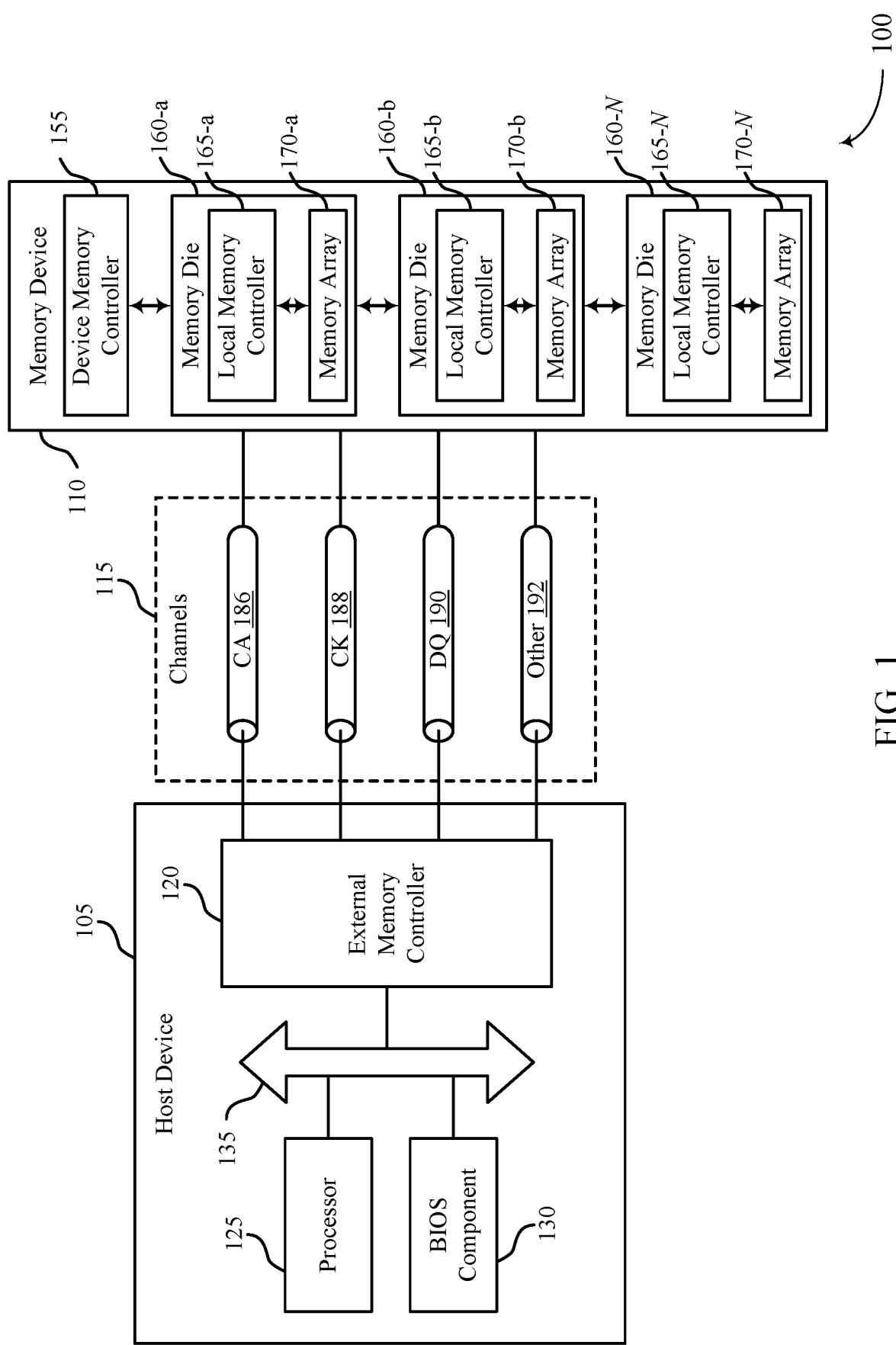
FIG. 1 illustrates an example of a system that supports error evaluation for a memory system in accordance with examples as disclosed herein.

FIG. 1 illustrates an example of a system 100 that supports error evaluation for a memory system in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host (e.g., host device 105).

A memory device 110 may be an independent device or a component that is operable to provide locations to store information (e.g., physical memory addresses) that may be used by the system 100 (e.g., for storing information, for reading information). In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., a controller local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, errors related to the operation of (e.g., access of) a memory device 110 may be associated with faults of the system 100 that are outside the memory device 110. For example, an error related to the operation of a memory device 110 may be associated with a failure of a power supply (e.g., voltage instability or current instability of a component providing power to the memory device 110), socket damage (e.g., intermittent terminal connections between a host device 105 and the memory device 110, unstable impedance of a channel 115, poor socketing), chipset training issues (e.g., training issues or other signaling instability associated with an external memory controller 120, instability of a data eye), clock signal failures (e.g., instability of signaling on a CK channel, an inability to register information over a channel 115 in accordance with clock signaling), or other faults (e.g., "system" faults). In some examples, errors related to the operation of a memory device 110 may be improperly attributed to a failure of the memory device 110, rather than attributed to an instigating fault of a component of the system 100 that is outside the memory device 110, which may result in improper fault diagnosis or improper efforts for fault resolution in the system 100, such as an unnecessary diagnosis of or replacement of the memory device 110.

In accordance with examples as disclosed herein, a memory device 110 may be configured to monitor access errors of the memory device 110 to support an evaluation of a likelihood that such errors are related to a failure of the memory device 110 or to a failure outside the memory device 110 (e.g., a failure of a host device 105 coupled with the memory device 110 or another portion of the system 100). For example, a memory device 110 may include multiple banks (e.g., multiple sets of physical addresses), which may refer to multiple banks of a memory die 160 of the memory device 110 (e.g., multiple banks of a memory array 170 of the memory die 160, banks of multiple memory arrays 170 of a memory die 160), or banks of multiple memory dies 160 of the memory device 110, or various combinations thereof. During operation of the memory device 110, the memory device 110 may monitor (e.g., count, accumulate, measure, determine) a respective quantity of access errors associated with each of the banks (e.g., associated with each set of physical addresses). For example, as a response to identifying an access error (e.g., a read error, a write error) of the memory device 110, the memory device 110 may associate the identified access error with one or more of the banks (e.g., with one or more addresses of the memory device 110), such as associating the access error with a memory die 160, or with a memory array 170, or with some portion of a memory array 170, and may increment a counter associated with the one or more banks. Over time, the respective quantity of access errors for each of the banks (e.g., a respective counter associated with each of the banks) may continue to accumulate if the memory device 110 continues to experience access errors, and the memory device 110 may evaluate the respective quantities of access errors associated with the different banks in an effort to infer a potential source of the access errors.

In some examples, an accumulation of access errors may be associated with relatively few of the banks of the memory device 110. For example, access errors may be relatively concentrated (e.g., associated with a relatively high proportion of a total quantity of access errors) in a single bank, or in banks of a single memory array 170, or in banks of a single memory die 160, among other groupings, whereas other banks may be associated with a relatively low proportion of the total quantity of access errors. In such examples, the access errors may be relatively more-likely to be associated with a fault of the memory device 110 itself (e.g., of the single bank, or of the memory array 170, or of the memory die 160 associated with the relative concentration of access errors), because such a concentration of access errors may be statistically unlikely to be a result of a failure outside the memory device 110. Accordingly, in such examples, a replacement or other maintenance operation of the memory device 110 may be warranted (e.g., if a quantity or rate of access errors satisfies a maintenance or replacement threshold).

In some other examples, an accumulation of access errors may be relatively dispersed (e.g., physically, spatially) across a plurality of banks of the memory device 110. For example, a plurality of banks (e.g., of a memory array 170, of a memory die 160, of a plurality of memory dies 160) may be associated with a relatively similar quantity of access errors. In such examples, the access errors may be relatively more-likely to be associated with a fault outside the memory device 110, because a distribution of access errors across the plurality of banks may be statistically unlikely to be a result of a failure of the memory device 110 itself. Accordingly, in such examples (e.g., where a quantity or rate of access errors for each of a plurality of banks satisfies a threshold), replacement or other maintenance operation of the memory device 110 may be not be warranted, because the access errors may be more likely a result of a fault elsewhere in the system 100.

In circumstances where an accumulation of access errors is relatively dispersed across the set of banks, the memory device 110 may store an indication that access errors are likely a result of a fault of a component of the system 100 that is outside the memory device (e.g., a fault of the host device 105 or other supporting component). For example, if the memory device 110 determines that a respective quantity of access errors, for a threshold quantity of banks (e.g., for plurality of banks, for the set of banks, for a subset of the set of banks), satisfies an error threshold (e.g., a threshold quantity of access errors), the memory device 110 may store a status indicator (e.g., in a mode register or other storage location of the memory device 110). The status indicator may indicate a likelihood of a system-related failure, which may be used to avoid unnecessary maintenance of or replacement of the memory device 110. For example, in response to reading the status indicator, a user may perform other troubleshooting or maintenance operations, which may include such system-level operations as replacing a socket (e.g., replacing a DIMM socket), rebooting the system 100 (e.g., rebooting the host device 105, reinitializing the host device 105), or swapping a component of the system 100 (e.g., swapping a chipset, swapping a motherboard), among other potential system-level operations, which may be more successful toward addressing access errors than repairing or replacing the memory device 110.

The described techniques for error evaluation may be supported by various monitoring, storage, and signaling techniques. For example, a counter associated with accumulating a quantity of observed access errors, as well as an identifier of an associated bank (e.g., a bank identified as having one or more access errors), may be implemented in accordance with content-addressable memory (CAM) of a memory device 110 (e.g., of a device memory controller 155, of a memory die 160, of a local memory controller 260, of a memory array 170-a), which may involve a volatile or non-volatile storage component (e.g., for storing a value of a counter, for storing an identifier of an associated bank). In some examples, such a counter may be associated with a threshold duration, such as monitoring or evaluating respective quantities of access errors within a time period (e.g., within a day or other static time interval, within a past 24 hours or other rolling time interval).

Further, a status indicator may be supported by various volatile or non-volatile storage components at the memory device 110. For example, such a status indicator may be implemented as part of a volatile latch of the memory device 110 (e.g., of a device memory controller 155) or a volatile memory array (e.g., a memory array 170) of the memory device 110, such as a mode register, which may support techniques where evaluations and determinations are maintained (e.g., stored, valid) within a power cycle of the memory device 110. Additionally or alternatively, such a status indicator may be implemented in a non-volatile storage component of the memory device 110, such as a non-volatile memory array (e.g., a memory array 170) or a one-time programmable storage component (e.g., of a device memory controller 155, a fuse, an antifuse) of the memory device 110, which may support techniques where diagnostic operations may be performed after a memory device is powered down or removed from the system 100 (e.g., decoupled from a host device 105).

In some examples, the described error evaluations may be associated with an access pattern of the memory device 110, which may support a selection of a threshold quantity of banks for evaluating whether access errors are a result of a fault outside the memory device 110, or a selection of the banks themselves for performing such an evaluation, or a selection of a threshold quantity of access errors for such an evaluation. For example, to support a uniform evaluation of a set of banks, the memory device 110 may sweep through the set of banks to evaluate the set of banks for access errors (e.g., read errors, write errors). In some examples, such techniques for access error evaluation may be associated with a periodic refresh associated with the set of banks, or an error control sweep associated with the set of banks (e.g., an error correction code (ECC) scrub associated with the set of banks, an error detection code (EDC) scrub associated with the set of banks).

In some examples, a selection of a quantity or set of banks for such evaluations may be based on an access pattern associated with commands (e.g., write commands, read commands, or a combination thereof) from a host device 105. For example, if a set of banks (e.g., a memory die 160, a memory array 170, a certain set of physical addresses) is accessed more-frequently, an evaluation of whether access errors are a result of a fault outside the memory device 110 may be performed within those banks, which may be accompanied by a change in a quantity of banks or a change in a threshold quantity of or scaling of access errors for setting the described status indicator. For example, a quantity of banks or a threshold quantity of access errors may be increased when access operations are more-concentrated in a subset of the banks of a memory device 110, since it may be more difficult to evaluate whether access errors of a more-concentrated portion of the memory device 110 are related to faults associated with the more-concentrated portion of the memory device 110.

An indication of the status indicator (e.g., a value of the status indicator) may be communicated outside the memory device 110 in accordance with various techniques. In some examples, a host device 105 may poll a memory device 110 for status information (e.g., by transmitting an error status request, while the host device 105 and the memory device 110 are coupled), which may include the host device 105 transmitting a status request to the memory device 110. In various examples, such polling by the host device 105 may be time-initiated (e.g., performed according to a periodic interval) or event-initiated (e.g., performed in response to identifying an error of the system 100, performed in response to identifying an error associated with accessing the memory device 110). In response to such polling by the host device 105, the memory device 110 may transmit indications of one or more status indicators, which may include an indication of whether a respective quantity of access errors, for a threshold quantity of banks of the set of banks, satisfies an error threshold (e.g., an indication of a potential failure of the system 100 that is outside the memory device 110). Additionally or alternatively, the memory device 110 may proactively transmit an indication of such a status indicator (e.g., without receiving a request from the host device 105). For example, the memory device 110 may identify an operating condition of the memory device 110, such as an error condition of the memory device (e.g., a quantity of non-correctible errors satisfying a threshold, a quantity of data corrections satisfying a threshold), and, based on such an identification by the memory device 110, the memory device 110 may transmit an indication of the status indicator (e.g., to the host device 105).

In some examples, a host device 105 may signal an indication of an error condition (e.g., to a user, to a component of the system 100) based on receiving such an indication from a memory device 110, which may support an indication of a likelihood that access errors are associated with a fault inside the memory device 110 or a fault outside a memory device. For example, the host device 105 may signal an indication of an error condition associated with the memory device (e.g., based on the indication indicating that the respective quantity of access errors, for the threshold quantity of banks, does not satisfy the error threshold), or may signal an indication of an error condition associated with the host device 105 (e.g., based on the indication indicating that the respective quantity of access errors, for the threshold quantity of banks, satisfies the error threshold). In some examples, a status indicator of the memory device 110 may be retrieved after the memory device 110 is removed from the system 100, which may support an evaluation of whether the memory device 110 was properly removed (e.g., for an evaluation of whether the memory device 110 may be reinstalled, for an evaluation of whether a warranty claim associated with the memory device 110 is proper)

Thus, in accordance with examples as disclosed herein, one or more aspects of a system 100 may be configured to support an improved evaluation of errors associated with accessing a memory device 110 by evaluating a distribution (e.g., a spatial distribution, a physical distribution) of access errors associated with the memory device. For example, a memory device 110 may be configured to support an evaluation of access errors among different sets of physical addresses of the memory device 110, which may support an inference of a likelihood that access errors are due to faults within the memory device 110 or outside the memory device 110, which may improve an ability to attribute access errors to different components of the system 100. Accordingly, various aspects of the described techniques may be implemented to support improved fault diagnosis or resolution efforts, such as refraining from replacing a memory device 110 when access errors are more likely to be the result of a system failure.

The system 100 may include any quantity of non-transitory computer readable media that support error evaluation for a memory system. For example, an external memory controller 120, a device memory controller 155, or a local memory controller 165 may include or otherwise may access one or more non-transitory computer-readable media storing instructions (e.g., firmware) for performing the functions ascribed herein to a host device 105, a memory device 110, or a memory die 160. For example, such instructions, if executed by the host device 105 (e.g., by the external memory controller 120), by the memory device 110 (e.g., by the device memory controller 155), or by the memory die 160 (e.g., by the local memory controller 165), may cause the host device 105, the memory device 110, or the memory die 160 to perform one or more associated functions as described herein.

Figure 2:
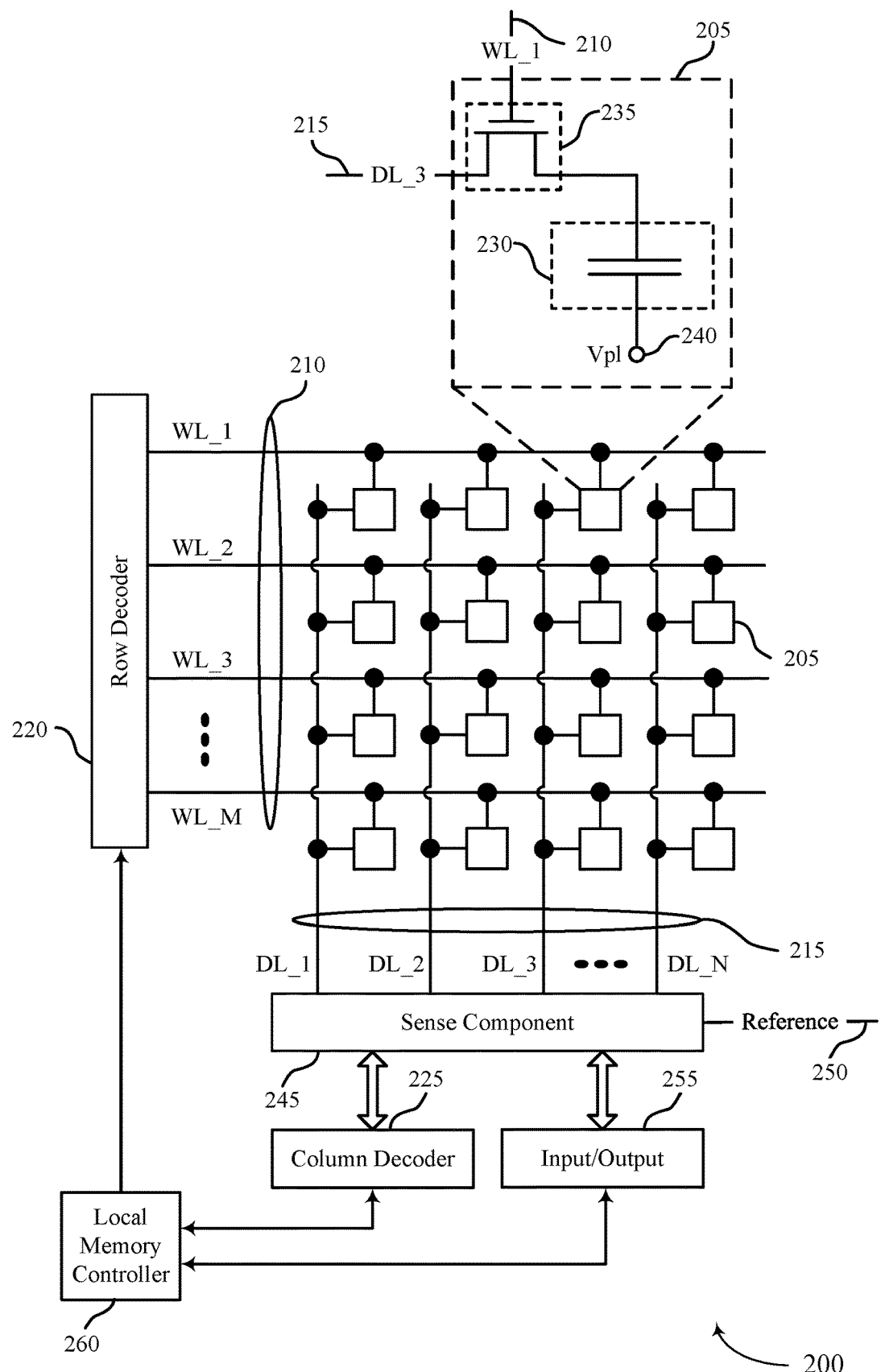
FIG. 2 illustrates an example of a memory die that supports error evaluation for a memory system in accordance with examples as disclosed herein.

FIG. 2 illustrates an example of a memory die 200 that supports error evaluation for a memory system in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210 and digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or a combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

In some examples, errors related to the operation of a memory device 110 that includes the memory die 200 may be associated with faults that are outside the memory device 110, such as power supply failures, socket damage, chipset training issues, or motherboard issues, among others. However, some such errors may be improperly attributed to a failure of the memory device 110, which may result in improper fault diagnosis or improper efforts toward fault resolution in the system, such as an unnecessary replacement of the memory device 110.

In accordance with examples as disclosed herein, a memory device 110 that includes one or more memory dies (e.g., the memory die 200) may be configured to monitor access errors of the memory dies to support an evaluation of a likelihood that such errors are related to a failure of the memory device 110 (e.g., of the memory die 200) or to a failure outside the memory device 110. For example, a memory device 110 may include multiple banks, which may refer to various sets of physical addresses (e.g., sets of memory cells 205) of the one or more memory dies. During access of the multiple banks, the memory device 110 (e.g., the memory die 200) may perform various error control operations (e.g., ECC operations, EDC operations, on-die operations of a local memory controller 260, of a device memory controller 155), which may identify errors associated with such access. If the memory device 110 detects that multiple banks are associated with a threshold quantity of access errors (e.g., that each bank of a plurality of banks is associated with a quantity of access errors that exceeds a threshold, a physical distribution of memory cells 205 associated with access errors), the memory device 110 may infer the presence of a failure outside the memory device 110, because such a distribution of access errors may be statistically unlikely to be a result of a failure of the memory device 110 itself. The memory device 110 may store an indication of such a detection (e.g., in a storage component of the memory device 110, in a storage component of the memory die 200), which may be used to support improved fault diagnosis or resolution efforts, such as refraining from replacing a memory device when access errors are more likely to be the result of a system failure. Thus, in accordance with examples as disclosed herein, one or more aspects of a memory die 200 may be configured to support an improved evaluation of errors associated with accessing a memory device 110 that includes the memory die 200.

Figure 3:
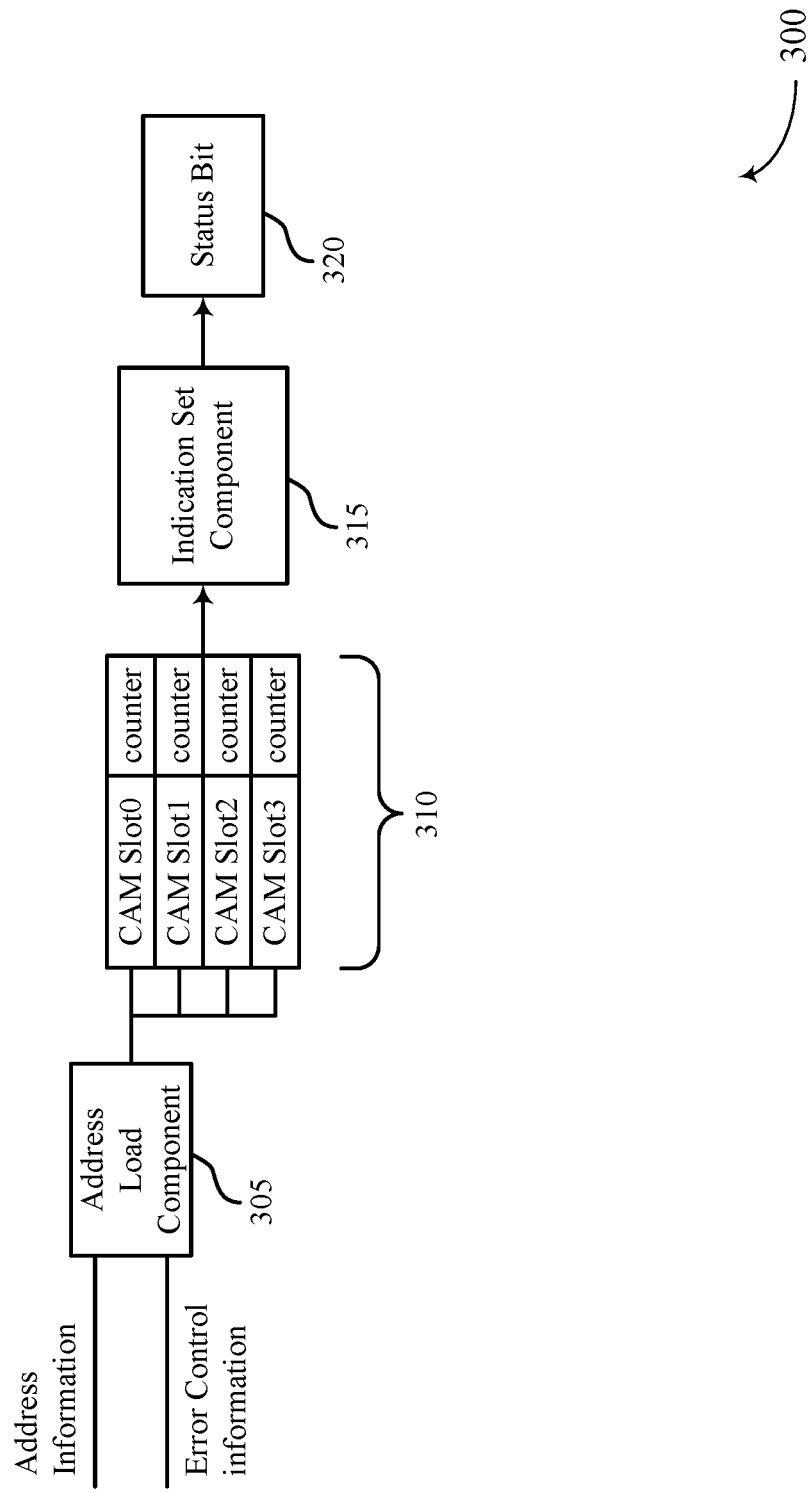
FIG. 3 illustrates an example of an error evaluation implementation that supports error evaluation for a memory system in accordance with examples as disclosed herein.

FIG. 3 illustrates an example of an error evaluation implementation 300 that supports error evaluation for a memory system in accordance with examples as disclosed herein. The error evaluation implementation 300 may be implemented in a memory device 110 as described herein. For example, the error evaluation implementation 300 may support various aspects of monitoring a respective quantity of access errors for a set of banks of a memory device 110 (e.g., a physical distribution of access errors), and storing a status indicator based on determining that the respective quantity of access errors, for a threshold quantity of banks, satisfies an error threshold.

The example of error evaluation implementation 300 includes an address load component 305 (e.g., a load circuit, load logic), which may support monitoring access errors for the banks of a memory device 110. For example, the address load component 305 may receive address information (e.g., an indication of a bank of memory cells 205, an indication of a bank address, an indication of a bank group) and error control information (e.g., an indication of an access error associated with a bank). In some examples, the error control information may be received from an error control component of the memory device 110, such as an on-die ECC component of a memory die 200, or another component of a memory die 200 (e.g., a local memory controller 260), a memory die 160 (e.g., a local memory controller 165), or the memory device 110 (e.g., a device memory controller 155). If the address load component 305 receives an indication of an access error for a bank indicated by the address information, the address load component 305 may load an associated indication in a CAM 310.

The CAM 310 may be an example of a component operable to store an indication of a quantity of access errors for a set of banks of the memory device 110, which may refer to a storage component of a memory device 110 (e.g., associated with a device memory controller 155) a memory die 160 (e.g., associated with a local memory controller), or a memory die 200 (e.g., associated with a local memory controller 260, associated with memory cells 205). For example, each slot of the CAM 310 may be associated with a respective bank, and may include a counter field. In some examples, a bank address may be loaded in the CAM 310 (e.g., by the address load component 305) if an error control operation, such as an ECC correction, has been performed on an associated bank. In some examples, a counter field of the CAM 310 may be incremented for each error control operation performed on the associated bank. In the example of error evaluation implementation 300, the CAM 310 may include four slots (e.g., as a four-deep CAM), but other examples of the error evaluation implementation 300 may include any quantity of one or more slots (e.g., a plurality of slots). In some examples, the CAM 310 may be implemented to monitor addresses and access errors over (e.g., within) a duration, which may be associated with the CAM 310 being reset (e.g., purged, erased, reinitialized) according to a periodic interval (e.g., to monitor addresses and access errors within a given day or other duration), or may be associated with entries being removed after a duration since the entry was loaded (e.g., to monitor addresses and access errors withing a rolling 24-hour window or other duration).

The indication set component 315 (e.g., a set circuit, set logic) may be configured to set a value of a status bit 320 (e.g., set a "System" fail flag) based on an evaluation of the CAM 310. For example, if counter fields of the CAM 310 satisfy a threshold (e.g., are over a limit, for a threshold quantity of slots), the indication set component 315 may be configured to store a value of the status bit 320 that indicates a determination that the respective quantity of access errors, for a threshold quantity of banks, satisfies an error threshold. In some examples, a threshold quantity of banks may be equal to three banks, and an error threshold may be equal to 100 access errors (e.g., 100 corrections) for a given bank. In some examples, the threshold quantity of banks may be associated with a capacity of the CAM 310, such that satisfying the threshold quantity of banks may be associated with a condition where the CAM 310 is full (e.g., is storing a bank address in a threshold quantity of slots). Accordingly, in such an example, the indication set component 315 may be configured to set the value of the status bit 320 if three banks are each associated with 100 access errors. In some examples, setting such an indication may indicate that access errors are likely due to a failure outside the memory device 110 that is implementing the error evaluation implementation 300 (e.g., as a result of access errors being relatively dispersed through the memory device 110).

In various examples, the status bit 320 may be a field (e.g., a bit) of a mode register of the memory device 110, or some other field that may be stored in a volatile storage component (e.g., a volatile memory cell, a volatile latch), or in a non-volatile storage component (e.g., a non-volatile memory cell, a one-time programmable storage component). In various examples, an indication of the status bit 320 may be transmitted in response to a request (e.g., from a host device 105), or proactively (e.g., without a request, upon satisfying a transmission criteria), or may be polled (e.g., probed) after the memory device 110 is removed from an associated system 100.

Figure 4:
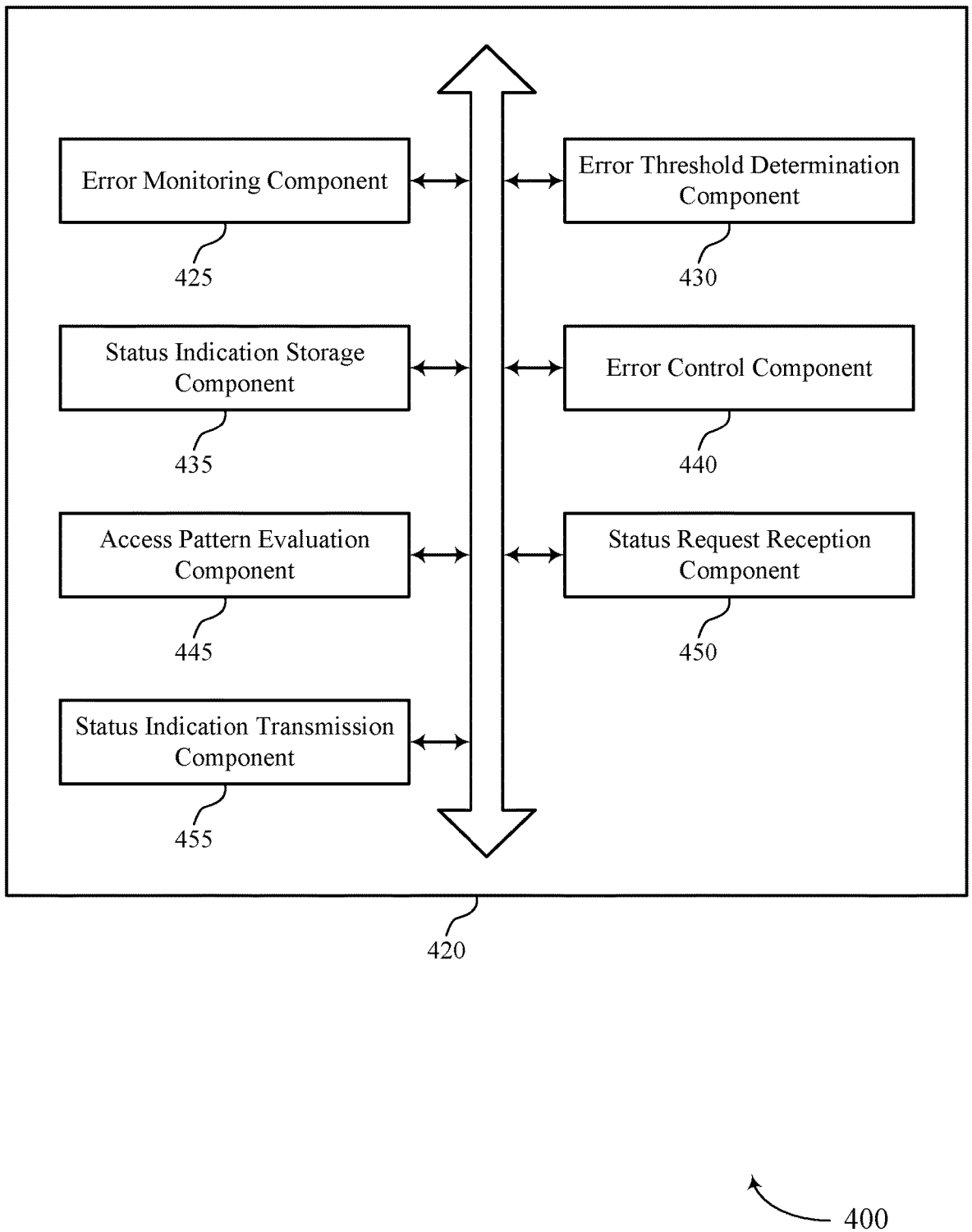
FIG. 4 shows a block diagram of a memory device that supports error evaluation for a memory system in accordance with examples as disclosed herein.

FIG. 4 shows a block diagram 400 of a memory device 420 that supports error evaluation for a memory system in accordance with examples as disclosed herein. The memory device 420 may be an example of aspects of a memory device as described with reference to FIGS. 1 through 3. For example, the memory device 420 may include a set of banks, each of which may be associated with a respective set of addresses (e.g., a set of physical addresses, a set of memory cells 205) of the 420. The memory device 420, or various components thereof, may be an example of means for performing various aspects of error evaluation for a memory system as described herein. For example, the memory device 420 may include an error monitoring component 425, an error threshold determination component 430, a status indication storage component 435, an error control component 440, an access pattern evaluation component 445, a status request reception component 450, a status indication transmission component 455, or any combination thereof. Each of these components may communicate, directly or indirectly, with one another (e.g., via one or more buses).

The error monitoring component 425 may be configured as or otherwise support a means for monitoring, for a set of banks of a memory device, a respective quantity of access errors identified using error control operations for the set of banks. The error threshold determination component 430 may be configured as or otherwise support a means for determining that the respective quantity of access errors, for a threshold quantity of banks, satisfies an error threshold based at least in part on monitoring the respective quantity of access errors. The status indication storage component 435 may be configured as or otherwise support a means for storing a status indicator based at least in part on the error threshold determination component 430 determining that the respective quantity of access errors satisfies the error threshold.

In some examples, the error threshold determination component 430 may be configured as or otherwise support a means for determining that the respective quantity of access errors, for the threshold quantity of banks, satisfies the error threshold within a duration.

In some examples, the error control component 440 may be configured as or otherwise support a means for performing one or more error evaluation operations associated with the set of banks, and the error monitoring component 425 monitoring the respective quantities of access errors may be associated with the error control component 440 performing the one or more error evaluation operations.

In some examples, the access pattern evaluation component 445 may be configured as or otherwise support a means for selecting the banks of the threshold quantity from the set of banks based at least in part on a pattern of access operations performed on the memory device. In some examples, the access pattern evaluation component 445 may be configured as or otherwise support a means for determining the threshold quantity based at least in part on a pattern of access operations performed on the memory device.

In some examples, the status request reception component 450 may be configured as or otherwise support a means for receiving an error status request from a host device. In some examples, the status indication transmission component 455 may be configured as or otherwise support a means for transmitting, to the host device based at least in part on the status request reception component 450 receiving the error status request, an indication of the status indicator.

In some examples, the error control component 440 may be configured as or otherwise support a means for identifying a quantity of one or more non-correctible errors. In some examples, the status indication transmission component 455 may be configured as or otherwise support a means for transmitting, to a host device based at least in part on the error control component 440 identifying the quantity of one or more non-correctible errors, an indication of the status indicator.

In some examples, to support storing the status indicator, the status indication storage component 435 may be configured as or otherwise support a means for storing the status indicator in a volatile storage element of the memory device.

In some examples, to support storing the status indicator, the status indication storage component 435 may be configured as or otherwise support a means for storing the status indicator in a non-volatile storage element or a one-time programmable storage element of the memory device.

The described means for supporting the operations of the memory device 420 (e.g., the illustrated components of the memory device 420) may be implemented in hardware. Such hardware may include circuitry (a processor, a DSP, an ASIC, an FPGA or other programmable logic device, discrete gate or transistor logic, discrete hardware components, or any combination thereof) configured as or otherwise supporting a means for performing the associated operations. Additionally or alternatively, in some examples, the described means for supporting the operations of the memory device 420 may be implemented as instructions (e.g., as software, as firmware, code stored in a non-transitory computer-readable medium) executed by a processor (e.g., a general-purpose processor, a DSP, a CPU, an ASIC, an FPGA, or any combination thereof). If implemented as instructions executed by a processor, the instructions may be executable by the processor to cause the memory device 420 to perform the associated operations. In some examples, the memory device 420 may be configured to perform various operations using or otherwise in cooperation with a receiver, a transmitter, or both. For example, the memory device 420 may receive information using a receiver (e.g., an input node, an input terminal, a receive buffer, a differential line receiver, a digital-to-analog converter, a demodulator), or send information using transmitter (e.g., an output node, an output terminal, a driver, a transmit buffer, an analog-to-digital converter, a modulator). In some examples, such a receiver, or transmitter, or both may be coupled with a channel (e.g., for communication with a host device).

Figure 5:
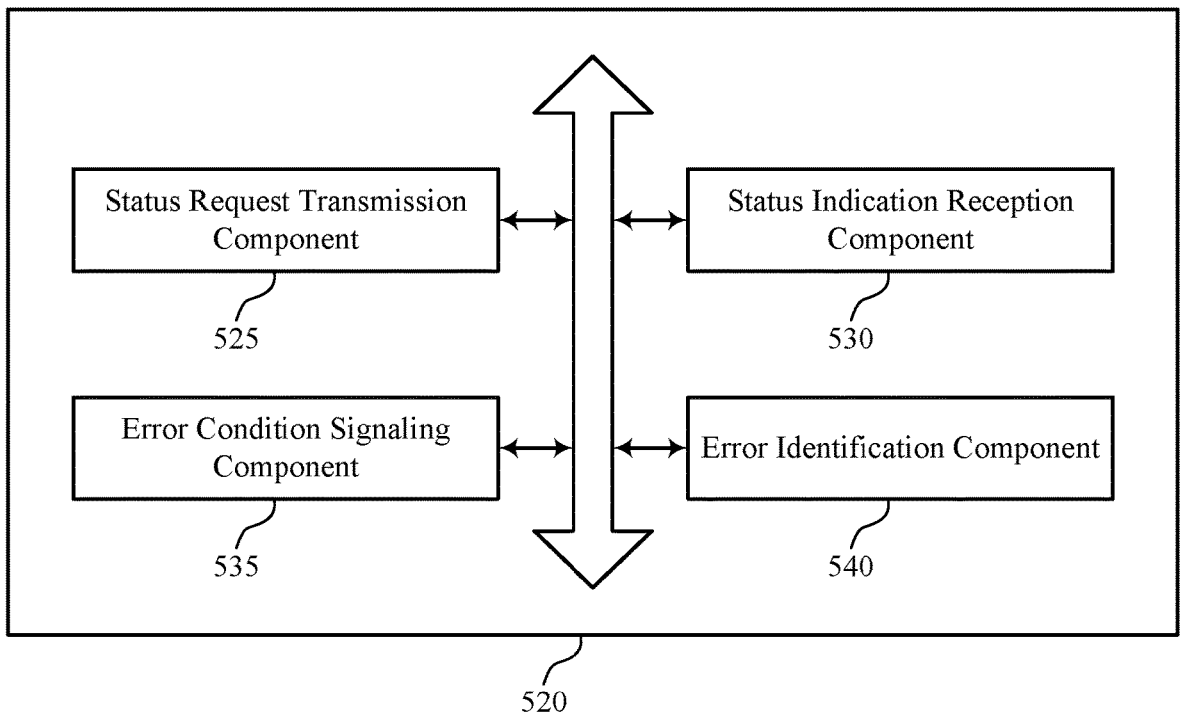
FIG. 5 shows a block diagram of a host device that supports error evaluation for a memory system in accordance with examples as disclosed herein.

FIG. 5 shows a block diagram 500 of a host device 520 that supports error evaluation for a memory system in accordance with examples as disclosed herein. The host device 520 may be an example of aspects of a host device as described with reference to FIGS. 1 through 3. The host device 520, or various components thereof, may be an example of means for performing various aspects of error evaluation for a memory system as described herein. For example, the host device 520 may include a status request transmission component 525, a status indication reception component 530, an error condition signaling component 535, an error identification component 540, or any combination thereof. Each of these components may communicate, directly or indirectly, with one another (e.g., via one or more buses).

The status request transmission component 525 may be configured as or otherwise support a means for transmitting a request for an error status of a memory device associated with a set of banks. The status indication reception component 530 may be configured as or otherwise support a means for receiving, from the memory device based at least in part on the status request transmission component 525 transmitting the request, an indication of whether a respective quantity of access errors, for a threshold quantity of banks of the set of banks, satisfies an error threshold.

In some examples, the status indication reception component 530 may receive a first indication that the respective quantity of access errors, for the threshold quantity of banks, does not satisfy the error threshold, and the error condition signaling component 535 may be configured as or otherwise support a means for signaling a second indication of an error condition associated with the memory device based at least in part on the status indication reception component 530 receiving the first indication.

In some examples, the receiving includes receiving a first indication that the respective quantity of access errors, for the threshold quantity of banks, satisfies the error threshold, and the error condition signaling component 535 may be configured as or otherwise support a means for signaling a second indication of an error condition associated with the host device based at least in part on the status indication reception component 530 receiving the first indication.

In some examples, the error identification component 540 may be configured as or otherwise support a means for identifying an error associated with accessing the memory device, and the status request transmission component 525 may transmit the request based at least in part on the error identification component 540 identifying the error.

In some examples, the status request transmission component 525 may transmit the request based at least in part on a periodic interval.

The described means for supporting the operations of the host device 520 (e.g., the illustrated components of the host device 520) may be implemented in hardware. Such hardware may include circuitry (a processor, a DSP, an ASIC, an FPGA or other programmable logic device, discrete gate or transistor logic, discrete hardware components, or any combination thereof) configured as or otherwise supporting a means for performing the associated operations. Additionally or alternatively, in some examples, the described means for supporting the operations of the host device 520 may be implemented as instructions (e.g., as software, as firmware, code stored in a non-transitory computer-readable medium) executed by a processor (e.g., a general-purpose processor, a DSP, a CPU, an ASIC, an FPGA, or any combination thereof). If implemented as instructions executed by a processor, the instructions may be executable by the processor to cause the host device 520 to perform the associated operations. In some examples, the host device 520 may be configured to perform various operations (e.g., receiving, monitoring, transmitting, indicating) using or otherwise in cooperation with a receiver, a transmitter, or both. For example, the host device 520 may receive information using a receiver (e.g., an input node, an input terminal, a receive buffer, a differential line receiver, a digital-to-analog converter, a demodulator), or send information using transmitter (e.g., an output node, an output terminal, a driver, a transmit buffer, an analog-to-digital converter, a modulator). In some examples, such a receiver, or transmitter, or both may be coupled with a channel (e.g., for communication with a memory device), or a peripheral device or other input/output device (e.g., for communication with a user, for communication with another component of a system).

Figure 6:
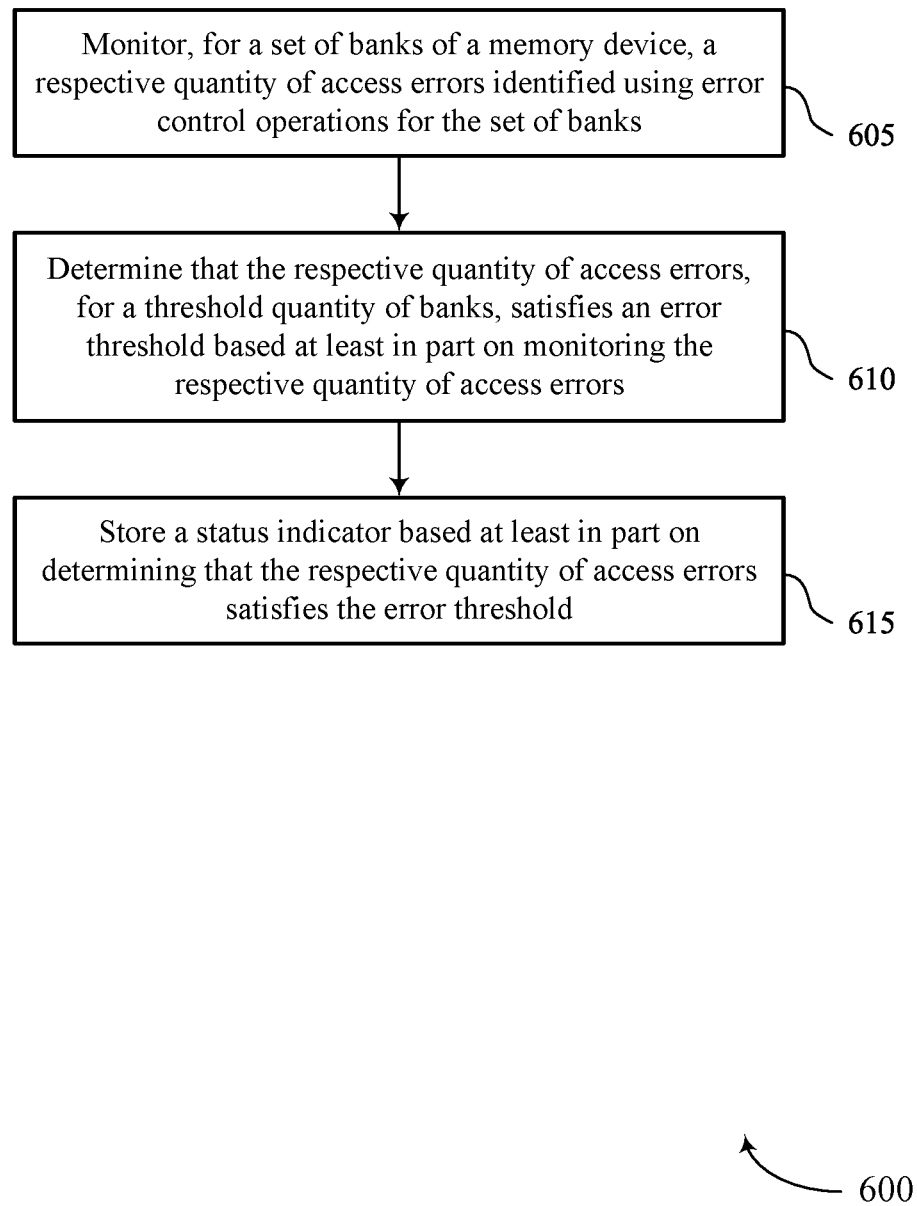
FIGS. 6 and 7 show flowcharts illustrating a method or methods that support error evaluation for a memory system in accordance with examples as disclosed herein.

FIG. 6 shows a flowchart illustrating a method 600 or methods that support error evaluation for a memory system in accordance with examples as disclosed herein. The operations of method 600 may be implemented by a memory device or its components as described herein. For example, the operations of method 600 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 605, the method may include monitoring, for a set of banks of a memory device, a respective quantity of access errors identified using error control operations for the set of banks. The operations of 605 may be performed in accordance with examples as disclosed herein. In some examples, aspects of the operations of 605 may be performed by an error monitoring component 425 as described with reference to FIG. 4.

At 610, the method may include determining that the respective quantity of access errors, for a threshold quantity of banks, satisfies an error threshold based at least in part on monitoring the respective quantity of access errors. The operations of 610 may be performed in accordance with examples as disclosed herein. In some examples, aspects of the operations of 610 may be performed by an error threshold determination component 430 as described with reference to FIG. 4.

At 615, the method may include storing (e.g., at the memory device) a status indicator based at least in part on determining that the respective quantity of access errors satisfies the error threshold. The operations of 615 may be performed in accordance with examples as disclosed herein. In some examples, aspects of the operations of 615 may be performed by a status indication storage component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for monitoring, for a set of banks of a memory device, a respective quantity of access errors identified using error control operations for the set of banks; determining that the respective quantity of access errors, for a threshold quantity of banks, satisfies an error threshold based at least in part on monitoring the respective quantity of access errors; and storing, at the memory device, a status indicator based at least in part on determining that the respective quantity of access errors satisfies the error threshold.

Aspect 2: The method, apparatus, or non-transitory computer-readable medium of aspect 1 where each bank is associated with a respective set of physical addresses of the memory device.

Aspect 3: The method, apparatus, or non-transitory computer-readable medium of any of aspects 1 through 2 where the determining includes operations, features, circuitry, logic, means, or instructions, or any combination thereof for determining that the respective quantity of access errors, for the threshold quantity of banks, satisfies the error threshold within a duration.

Aspect 4: The method, apparatus, or non-transitory computer-readable medium of any of aspects 1 through 3, further including operations, features, circuitry, logic, means, or instructions, or any combination thereof for performing one or more error evaluation operations associated with the set of banks, where monitoring the respective quantities of access errors is associated with performing the one or more error evaluation operations.

Aspect 5: The method, apparatus, or non-transitory computer-readable medium of any of aspects 1 through 4, further including operations, features, circuitry, logic, means, or instructions, or any combination thereof for selecting the banks of the threshold quantity from the set of banks based at least in part on a pattern of access operations performed on the memory device.

Aspect 6: The method, apparatus, or non-transitory computer-readable medium of any of aspects 1 through 5, further including operations, features, circuitry, logic, means, or instructions, or any combination thereof for determining the threshold quantity based at least in part on a pattern of access operations performed on the memory device.

Aspect 7: The method, apparatus, or non-transitory computer-readable medium of any of aspects 1 through 6, further including operations, features, circuitry, logic, means, or instructions, or any combination thereof for receiving an error status request from a host device and transmitting, to the host device based at least in part on receiving the error status request, an indication of the status indicator.

Aspect 8: The method, apparatus, or non-transitory computer-readable medium of any of aspects 1 through 7, further including operations, features, circuitry, logic, means, or instructions, or any combination thereof for identifying, at the memory device, a quantity of one or more non-correctible errors and transmitting, to a host device based at least in part on identifying the quantity of one or more non-correctible errors, an indication of the status indicator.

Aspect 9: The method, apparatus, or non-transitory computer-readable medium of any of aspects 1 through 8 where storing the status indicator includes operations, features, circuitry, logic, means, or instructions, or any combination thereof for storing the status indicator in a volatile storage element of the memory device.

Aspect 10: The method, apparatus, or non-transitory computer-readable medium of any of aspects 1 through 8 where storing the status indicator includes operations, features, circuitry, logic, means, or instructions, or any combination thereof for storing the status indicator in a non-volatile storage element or a one-time programmable storage element of the memory device.

Figure 7:
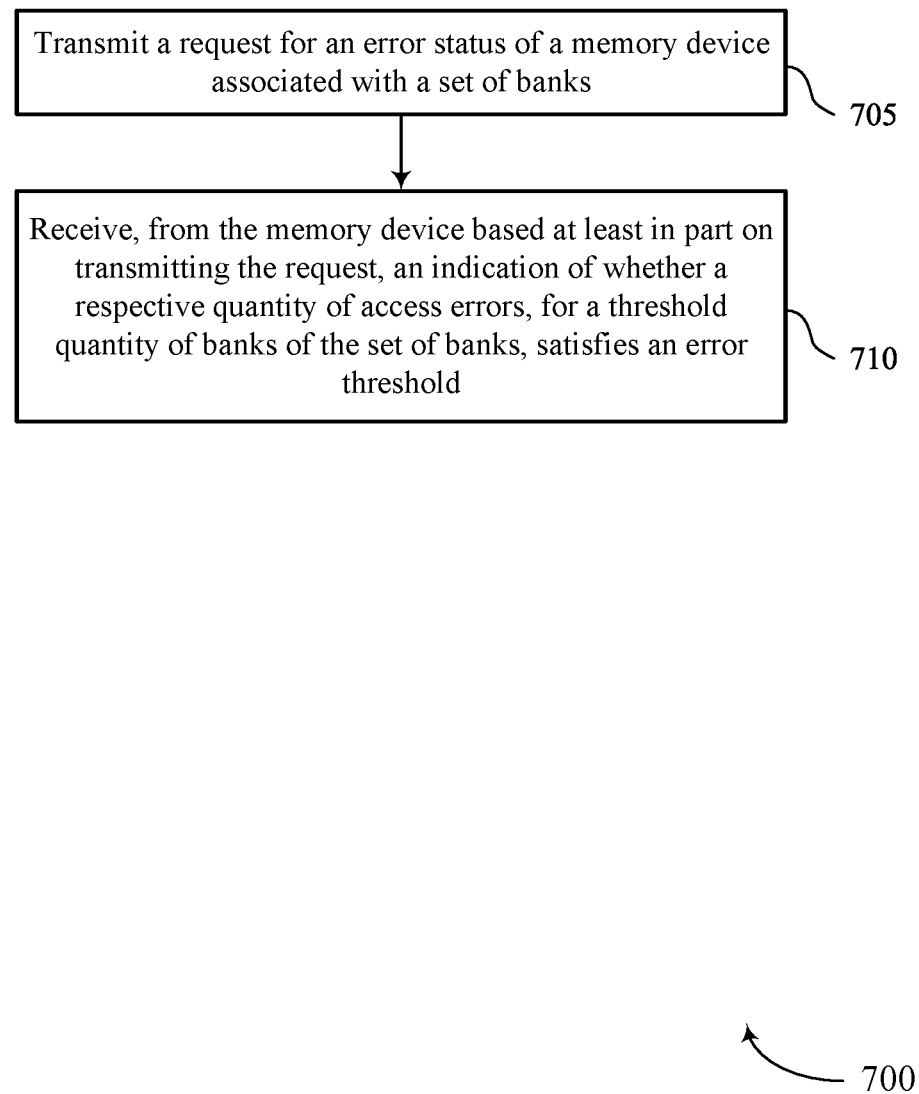

FIG. 7 shows a flowchart illustrating a method 700 or methods that supports error evaluation for a memory system in accordance with examples as disclosed herein. The operations of method 700 may be implemented by a host device or its components as described herein. For example, the operations of method 700 may be performed by a host device as described with reference to FIGS. 1 through 3 and 5. In some examples, a host device may execute a set of instructions to control the functional elements of the device to perform the described functions. Additionally or alternatively, the host device may perform aspects of the described functions using special-purpose hardware.

At 705, the method may include transmitting (e.g., by a host device) a request for an error status of a memory device associated with a set of banks. The operations of 705 may be performed in accordance with examples as disclosed herein. In some examples, aspects of the operations of 705 may be performed by a status request transmission component 525 as described with reference to FIG. 5.

At 710, the method may include receiving, from the memory device based at least in part on transmitting the request, an indication of whether a respective quantity of access errors, for a threshold quantity of banks of the set of banks, satisfies an error threshold. The operations of 710 may be performed in accordance with examples as disclosed herein. In some examples, aspects of the operations of 710 may be performed by a status indication reception component 530 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for transmitting, by a host device, a request for an error status of a memory device associated with a set of banks and receiving, from the memory device based at least in part on transmitting the request, an indication of whether a respective quantity of access errors, for a threshold quantity of banks of the set of banks, satisfies an error threshold.

Aspect 12: The method, apparatus, or non-transitory computer-readable medium of aspect 11 where the receiving includes receiving a first indication that the respective quantity of access errors, for the threshold quantity of banks, does not satisfy the error threshold, and the method, apparatuses, and non-transitory computer-readable medium, further includes operations, features, circuitry, logic, means, or instructions, or any combination thereof for signaling a second indication of an error condition associated with the memory device based at least in part on receiving the first indication.

Aspect 13: The method, apparatus, or non-transitory computer-readable medium of any of aspect 11 through 12 where the receiving includes receiving a first indication that the respective quantity of access errors, for the threshold quantity of banks, satisfies the error threshold, and the method, apparatuses, and non-transitory computer-readable medium, further includes operations, features, circuitry, logic, means, or instructions, or any combination thereof for signaling a second indication of an error condition associated with the host device based at least in part on receiving the first indication.

Aspect 14: The method, apparatus, or non-transitory computer-readable medium of any of aspects 11 through 13, further including operations, features, circuitry, logic, means, or instructions, or any combination thereof for identifying (e.g., at the host device) an error associated with accessing the memory device, where transmitting the request is based at least in part on identifying the error.

Aspect 15: The method, apparatus, or non-transitory computer-readable medium of any of aspects 11 through 14 where transmitting the request is based at least in part on a periodic interval.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   monitoring, for each bank of a set of banks of a memory device, a respective quantity of access errors identified using error control operations for the set of banks;
   determining that the respective quantity of access errors, for each bank of a plurality of the set of banks, satisfies an error threshold based at least in part on the monitoring of the respective quantity of access errors; and
   storing, at the memory device, a status indicator based at least in part on determining that a quantity of the plurality of the set of banks satisfies a threshold quantity of banks.

2. The method of claim 1, wherein each bank of the set of banks is associated with a respective set of physical addresses of the memory device.

3. The method of claim 1, wherein the determining comprises:
   determining that the respective quantity of access errors, for the each bank of the plurality of the set of banks, satisfies the error threshold within a duration.

4. The method of claim 1, further comprising:
   performing one or more error evaluation operations associated with the set of banks, wherein monitoring the respective quantities of access errors is associated with performing the one or more error evaluation operations.

5. The method of claim 1, further comprising:
   selecting banks for the plurality of the set of banks from the set of banks based at least in part on a pattern of access operations performed on the memory device.

6. The method of claim 1, further comprising:
   determining the threshold quantity of banks based at least in part on a pattern of access operations performed on the memory device.

7. The method of claim 1, further comprising:
   receiving an error status request from a host device; and
   transmitting, to the host device based at least in part on receiving the error status request, an indication of the status indicator.

8. The method of claim 1, further comprising:
   identifying, at the memory device, a quantity of one or more non-correctible errors; and
   transmitting, to a host device based at least in part on identifying the quantity of one or more non-correctible errors, an indication of the status indicator.

9. The method of claim 1, wherein storing the status indicator comprises:
   storing the status indicator in a volatile storage element of the memory device.

10. The method of claim 1, wherein storing the status indicator comprises:
    storing the status indicator in a non-volatile storage element or a one-time programmable storage element of the memory device.

11. A method, comprising:
    transmitting, by a host device, a request for an error status of a memory device associated with a set of banks; and
    receiving, from the memory device based at least in part on transmitting the request, an indication of whether a respective quantity of access errors, for each of a threshold quantity of multiple banks of the set of banks, satisfies an error threshold.

12. The method of claim 11, wherein the receiving comprises receiving a first indication that the respective quantity of access errors, for the threshold quantity of multiple banks, does not satisfy the error threshold, the method further comprising:
    signaling a second indication of an error condition associated with the memory device based at least in part on receiving the first indication.

13. The method of claim 11, wherein the receiving comprises receiving a first indication that the respective quantity of access errors, for the threshold quantity of multiple banks, satisfies the error threshold, the method further comprising:
    signaling a second indication of an error condition associated with the host device based at least in part on receiving the first indication.

14. The method of claim 11, further comprising:
    identifying, at the host device, an error associated with accessing the memory device, wherein transmitting the request is based at least in part on identifying the error.

15. The method of claim 11, wherein transmitting the request is based at least in part on a periodic interval.

16. An apparatus, comprising:
    a memory array comprising a set of banks, wherein each bank is associated with a respective set of physical addresses of the memory array; and
    a controller operable to cause the apparatus to:
       monitor, for each bank, a respective quantity of access errors identified using error control operations for the set of banks;
       determine that the respective quantity of access errors, for each bank of a plurality of the set of banks, satisfies an error threshold based at least in part on the monitoring of the respective quantity of access errors; and store a status indicator based at least in part on determining that a quantity of the plurality of the set of banks satisfies a threshold quantity of banks.

17. The apparatus of claim 16, wherein the controller is further operable to cause the apparatus to:

determine that the respective quantity of access errors, for the each bank of a plurality of the set of banks, satisfies the error threshold within a duration.

18. The apparatus of claim 16, wherein the controller is further operable to cause the apparatus to:

perform one or more error evaluation operations associated with the set of banks, wherein monitoring the respective quantities of access errors is associated with performing the one or more error evaluation operations.

19. The apparatus of claim 16, wherein the controller is further operable to cause the apparatus to:

receive an error status request from a host device; and transmit, to the host device based at least in part on receiving the error status request, an indication of the status indicator.

20. The apparatus of claim 16, wherein the controller is further operable to cause the apparatus to:

identify a quantity of one or more non-correctible errors; and transmit, to a host device based at least in part on identifying the quantity of one or more non-correctible errors, an indication of the status indicator.

21. The apparatus of claim 16, further comprising:

a volatile storage element operable for storing the status indicator.

22. The apparatus of claim 16, further comprising:

a non-volatile storage element or a one-time programmable storage element operable for storing the status indicator.

23. An apparatus, comprising:

a controller operable for coupling with a memory device associated with a set of banks, wherein the controller is operable to cause the apparatus to:

transmit a request for an error status of the memory device; and receive, from the memory device based at least in part on transmitting the request, an indication of whether a respective quantity of access errors, for each of a threshold quantity of multiple banks of the set of banks, satisfies an error threshold.

24. The apparatus of claim 23, wherein the controller is further operable to cause the apparatus to:

receive a first indication that the respective quantity of access errors, for the threshold quantity of multiple banks, does not satisfy the error threshold; and signal a second indication of an error condition associated with the memory device based at least in part on receiving the first indication.

25. The apparatus of claim 23, wherein the controller is further operable to cause the apparatus to:

receive a first indication that the respective quantity of access errors, for each of the threshold quantity of multiple banks, satisfies the error threshold; and signal a second indication of an error condition associated with the apparatus based at least in part on receiving the first indication.

* * * * *